May 26, 1936.  D. F. TAYLOR  2,041,978
DEVICE FOR SECURING OR SEPARATING PARTS
HELD TOGETHER BY A FUSIBLE MATERIAL
Filed Nov. 15, 1934    2 Sheets-Sheet 1

INVENTOR
Dudley F. Taylor
BY Harold E. Stonebraker
ATTORNEY

May 26, 1936.  D. F. TAYLOR  2,041,978
DEVICE FOR SECURING OR SEPARATING PARTS
HELD TOGETHER BY A FUSIBLE MATERIAL
Filed Nov. 15, 1934   2 Sheets-Sheet 2

INVENTOR
Dudley F. Taylor
BY
Harold E. Stonebraker
ATTORNEY

Patented May 26, 1936

2,041,978

UNITED STATES PATENT OFFICE 2,041,978

DEVICE FOR SECURING OR SEPARATING PARTS HELD TOGETHER BY A FUSIBLE MATERIAL

Dudley F. Taylor, Indianapolis, Ind., assignor to Continental Optical Company, Inc., Rochester, N. Y., a corporation of Indiana Application November 15, 1934, Serial No. 753,182

5 Claims. (Cl. 219—12)

My invention relates to a device for securing together or separating parts held together by a fusible material such as solder, and relates more particularly to a mechanism adapted for fastening an eyeglass lens in a mounting by soldering, or for separating the parts to replace a broken lens, and it has for its purpose to afford a simply constructed and readily operated apparatus that will quickly and efficiently perform the functions stated.

In the assembling of eyeglass lenses in their mountings, attempts have been made to use pins, tubes, or the like extending through openings in the lenses and united to the mounting by suitable fusible material such as solder, and it is a purpose of the invention to afford a mechanism that may be used either fixedly mounted on a support, or as an instrument in the hands of the operator, to hold a lens and mounting in proper position and effect the necessary melting of the solder and securing of the parts together, or the removal of the attaching pin, tube, or the like when it is desirable to remove the attaching parts from a mounting to replace a lens.

A further object of the invention is to afford a structure that is economic to produce, of light weight so that it can be easily moved and manipulated, and which facilitates and insures maintaining the lens and mounting in proper relationship while the union is effected.

To these and other ends, the invention consists in the construction and arrangement of parts that will appear clearly from the following description when read in conjunction with the accompanying drawings, the novel features being pointed out in the claims following the specification.

Figure 1:
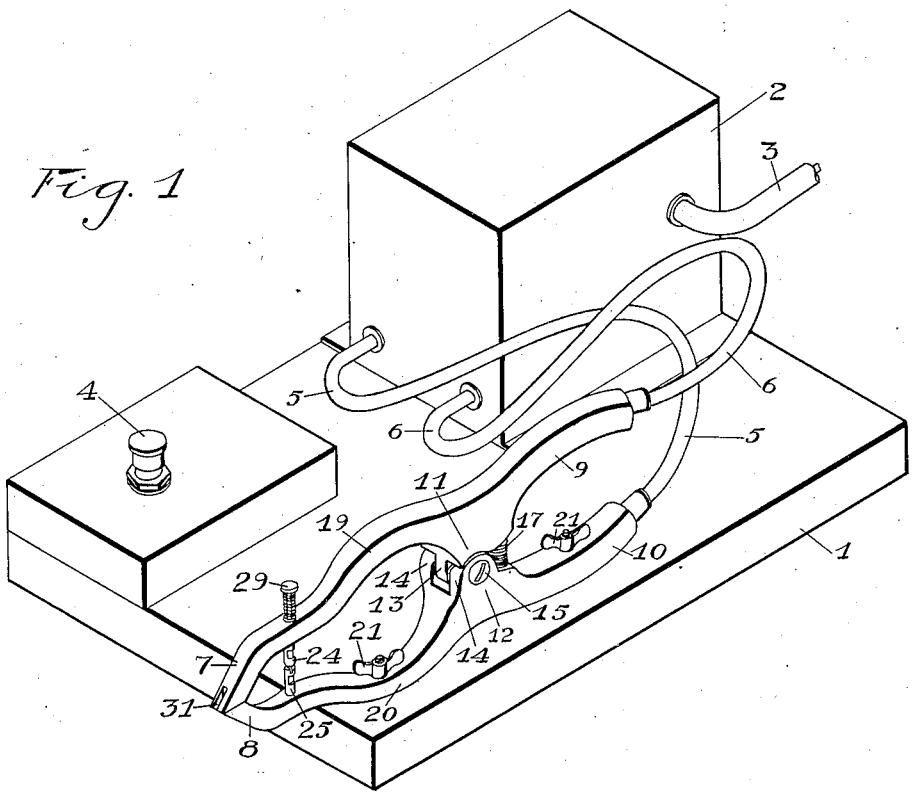
Fig. 1 is a perspective view, showing a preferred embodiment of the invention.

Referring more particularly to the drawings, in which like reference characters refer to the same parts throughout the several views, 1 designates a suitable base or support provided with a transformer 2 from which leads a conductor 3 adapted to be connected with any conventional socket or source of current supply, and a switch 4 for controlling the electrical operation. From the transformer 2 conductors 5 and 6 lead to the respective clamping members, being connected to the outer ends of the latter and completing a circuit through the clamping members and the work held between the jaws.

The clamping members may be constructed and connected in various ways, and for purposes of illustrating the invention, I have shown one preferred type in which the clamping members include attaching jaws 7 and 8 at one end, and handle portions 9 and 10 at the opposite ends, while 11 and 12 designate central connecting portions extending toward each other and pivotally connected.

For this purpose, the upper connecting portion 11 includes a lug 13 located between ears 14 of the lower connecting portion and pivotally secured thereto by a pin 15, while 16 is a sleeve of insulating material surrounding the pin 15 and extending between the lug 13 and the ears 14, to afford an electrical insulation between the clamping members at their pivotal connection.

17 designates a spring located between the clamping members, the upper end of said spring being seated in an insulating cup 18. The spring acts to separate the adjacent portions of the clamping members and to actuate the jaws 7 and 8 toward each other so as to hold the work when positioned between the jaws. Located between the pivotal connection just described and the attaching jaws 7 and 8 are handle portions 19 and 20 for a purpose that will be described presently.

The device may be used either as a hand instrument or fixedly located on the support 1, and for this purpose the handle portions 10 and 20 of the lower clamping member have openings therein to receive threaded posts mounted on the support 1, the clamping member being held thereon by the thumb nuts 21. By this means, the lower clamping member can be rigidly held on the support 1 in the manner shown in Fig. 1, although if the operator prefers, by removing the thumb nuts 21, the device may be lifted from the support 1 and held by the operator while in use.

Figure 2:
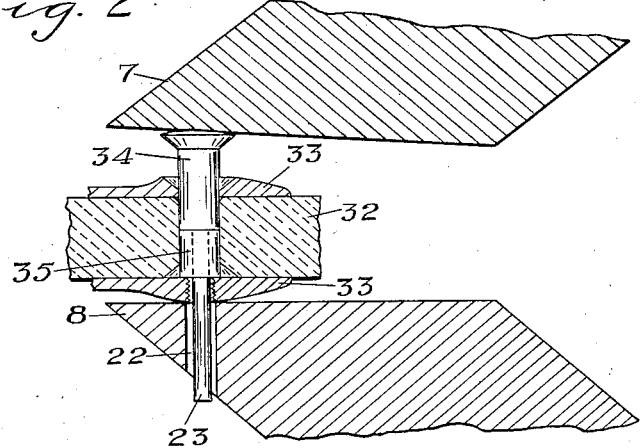
Fig. 2 is an enlarged longitudinal vertical sectional view through the attaching jaws of the clamping members, showing the work arranged in operative position preparatory to the securing operation.
Figure 3:
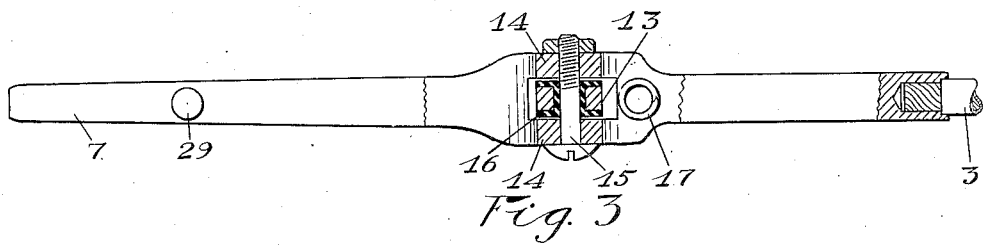
Fig. 3 is a plan view of the clamping members in the position shown in Fig. 1, with the upper clamping member broken away, and the pivotal joint appearing in horizontal section.
Figure 4:
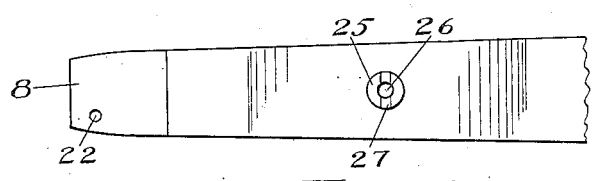
Fig. 4 is an enlarged plan view of a portion of the lower clamping member.
Figure 5:
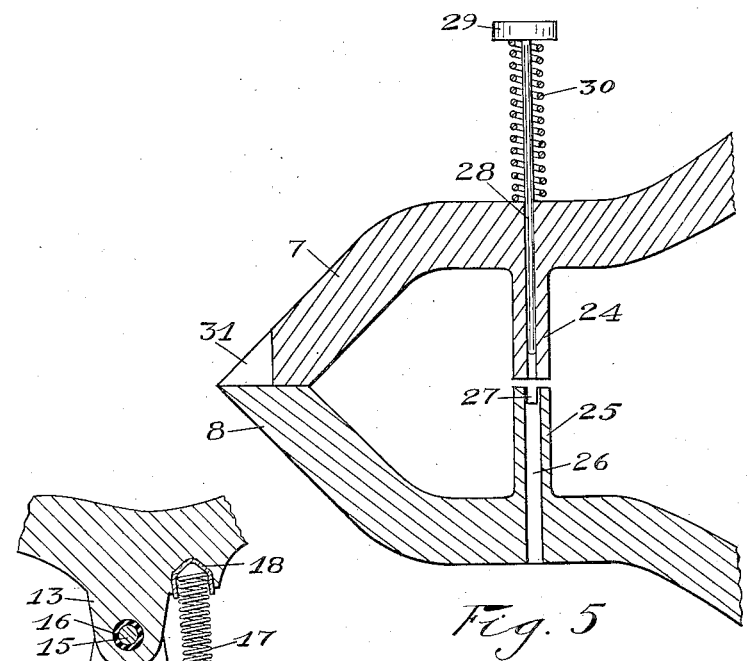
Fig. 5 is an enlarged longitudinal vertical sectional view through the jaws of the clamping members.
Figure 6:
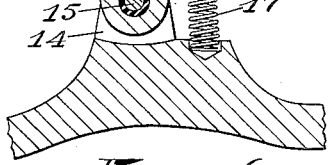
Fig. 6 is an enlarged longitudinal vertical sectional view of the pivotal joint between the clamping members.

The lower jaw 8 is provided with an opening 22, as shown in Figs. 2 and 4, to receive the lower end 23 of a pin used in holding a lens in its mounting, and to accommodate said pin when the parts are positioned for attachment between the jaws. Located between the jaws 7 and 8 and the pivotal connection already described is a second set of jaws indicated at 24 and 25 respectively, the lower jaw having an opening 26 therein and a socket 27 at its upper end, while the upper jaw has a depressible plunger 28 movable vertically in an opening in the jaw and adapted to be pushed downwardly by a handle 29 while a spring 30 holds the plunger in its normal upper position, as shown in Fig. 5. 31 is a slot or recess formed in the jaw 7 to receive a screwdriver or other tool sometimes employed for loosening the pin or attaching unit in certain types of mountings where it is not practical to use the plunger 28.

In the normal operation of securing a lens in a mounting of the type shown in Fig. 2, the handle portion 9 is pressed toward the handle portion 10 to open the jaws against the tension of the spring 17, and the parts already assembled are inserted as shown in Fig. 2. These include the eyeglass lens 32, upper and lower straps 33 of the mounting, the body or enlarged portion 34 of the attaching pin, and the solder sleeve 35 which surrounds the reduced portion 23 of the attaching pin.

The solder sleeve 35 is located on the reduced portion 23 of the attaching pin between the enlarged body portion 34 of the pin and the lower strap 33, as more fully set forth in copending patent application Serial No. 748,324, filed October 15, 1934. The reduced portion 23 of the attaching pin, being located in opening 22 as previously described, serves to center the parts and hold them in proper position. The clamping members are then released, the pressure of spring 17 being sufficient to hold the jaws against the work so as to maintain the parts in desired relation.

The switch 4 is then operated, closing the circuit and causing the necessary current to pass through the clamping members and the work and melting the solder sleeve 35. As the heat is thus applied to melt the solder, additional pressure is applied to the jaws by pressing handle portion 19 toward handle portion 20, thus forcing the pin 34 downwardly until it seats in the strap 33. This is more or less of an instantaneous operation, and as soon as the solder is melted and the pin 34 forced to the limit of its downward movement, the switch 4 is released and current cut off. The mounting may then be removed and the lower end of the pin 23 cut off adjacent to the outer surface of strap 33, as described in the copending application already recited.

When it is desirable to remove an attaching pin from a mounting to replace a lens, the mounting is inserted between the jaws 24 and 25 with the head of pin 34 located at the bottom, and resting in the socket 25. Then upon closing the switch and permitting current to pass through the work to remelt the solder, the plunger 28 is depressed against the action of the spring 30 and the attaching pin of the mounting is forced downwardly through the opening 26, and the mounting is then free to receive another lens.

While the invention has been described with reference to a particular construction and procedure, it is not confined to the precise disclosure set forth, and this application is intended to cover any modifications or departures coming within the purposes of the invention or the scope of the following claims.

I claim:

1. A device for securing or separating a plurality of parts held together by a fusible material, comprising two clamping members including central connecting portions extending toward each other and pivotally connected, said connecting portions being electrically insulated from each other, a jaw at one end of each of the clamping members for holding work therebetween, handle portions at the opposite ends of the clamping members, handle portions located between said pivotal connection and the jaws and symmetrical with the first mentioned handle portions, spring means for actuating the jaws toward each other, and electric conductors connected with the clamping members and operative to pass a current through said jaws and the work clamped therebetween.

2. A device for securing or separating a plurality of parts held together by a fusible material, comprising two clamping members including central connecting portions extending toward each other and pivotally connected, said connecting portions being electrically insulated from each other, a jaw at one end of each of the clamping members for holding work therebetween, handle portions at the opposite ends of the clamping members, handle portions located between said pivotal connection and the jaws and symmetrical with the first mentioned handle portions, spring means for actuating the jaws toward each other, electric conductors connected with the clamping members and operative to pass a current through said jaws and the work clamped therebetween, and means for removably securing the handle portions of the lower clamping member to a support.

3. A device for securing or separating a plurality of parts held together by a fusible material, comprising two clamping members including central connecting portions extending toward each other and pivotally connected, said connecting portions being electrically insulated from each other, a jaw at one end of each of the clamping members for holding work therebetween, handle portions at the opposite ends of the clamping members, handle portions located between said pivotal connection and the jaws and symmetrical with the first mentioned handle portions, means adapted to be removably associated with each of the handle portions of one of said clamping members for attaching it to a support, and electric conductors connected with the clamping members and operative to pass a current through said jaws and the work clamped therebetween.

4. A device for securing or separating a plurality of parts held together by a fusible material, comprising two clamping members including central connecting portions extending toward each other and pivotally connected, said connecting portions being electrically insulated from each other, a jaw at one end of each of the clamping members for holding work therebetween, handle portions at the opposite ends of the clamping members, handle portions located between said pivotal connection and the jaws and symmetrical with the first mentioned handle portions, one of said clamping members having an opening in each of its handle portions, means removably associated with said openings for securing said clamping member to a support, and electric conductors connected with the clamping members and operative to pass a current through said jaws and the work clamped therebetween.

5. A device for securing or separating a plurality of parts held together by a fusible material, comprising two clamping members including central connecting portions extending toward each other and pivotally connected, said connecting portions being electrically insulated from each other, a jaw at one end of each of the clamping members for holding work therebetween, one of said jaws having an opening to receive the attaching pin of an eyeglass mounting when securing the pin thereto, handle portions at the opposite ends of the clamping members, handle portions located between said pivotal connection and the jaws and symmetrical with the first mentioned handle portions, means adapted to be removably associated with the handle portions of one of said clamping members for securing it to a support, and electric conductors connected with the clamping members and operative to pass a current through said jaws and the work clamped thereto.

DUDLEY F. TAYLOR.